United States Patent
Andres Maldonado et al.

(10) Patent No.: US 12,407,437 B2
(45) Date of Patent: Sep. 2, 2025

(54) TIME SOURCE HEALTH MONITORING SUPPORT FOR NETWORK TIMING RESILIENCY

(71) Applicant: NOKIA TECHNOLOGIES OY, Espoo (FI)

(72) Inventors: Pilar Andres Maldonado, Aalborg (DK); Troels Emil Kolding, Klarup (DK); Thomas Haaning Jacobsen, Norresundby (DK); Devaki Chandramouli, Plano, TX (US); Rakash Sivasiva Ganesan, Unterhaching (DE); Renato Barbosa Abreu, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 254 days.

(21) Appl. No.: 17/936,205

(22) Filed: Sep. 28, 2022

(65) Prior Publication Data
US 2023/0100543 A1  Mar. 30, 2023

Related U.S. Application Data

(60) Provisional application No. 63/261,796, filed on Sep. 29, 2021.

(51) Int. Cl.
*H04J 3/06* (2006.01)
*G01S 19/25* (2010.01)

(52) U.S. Cl.
CPC .......... *H04J 3/0641* (2013.01); *G01S 19/256* (2013.01); *H04J 3/0652* (2013.01); *H04J 3/0667* (2013.01)

(58) Field of Classification Search
CPC ...... H04J 3/0641; H04J 3/0652; H04J 3/0667; G01S 19/256
See application file for complete search history.

(56) References Cited

U.S. PATENT DOCUMENTS 6,185,247 B1 * 2/2001 Williams .............. H04J 3/0638
 370/503
6,631,483 B1 * 10/2003 Parrish ...................... G06F 1/12
 713/400

(Continued)

OTHER PUBLICATIONS

"IEEE Standard for a Precision Clock Synchronization Protocol for Networked Measurement and Control Systems," in IEEE Std 1588-2019 (Revision of IEEE Std 1588-2008), (Jun. 16, 2020), 499 pages.
"Network Limits for Time Synchronization in Packet Networks with Partial Timing Support from the Network", International Telecommunication Union, ITU-T G8271.2, (May 2021), 26 pages.
Broadcom, "Discussion on the Use of 802.11 Preamble for NR-U", 3GPP TSG RAN WG1 Meeting #96, R2-1903146, (Feb. 25-Mar. 1, 2019), 12 pages.

(Continued)

*Primary Examiner* — Bailor C Hsu
(74) *Attorney, Agent, or Firm* — ALSTON & BIRD LLP

(57) ABSTRACT

Method, apparatuses, and computer program products provide means for monitoring time sources for nodes of a network and providing timing resiliency solutions. An example method includes: establishing time synchronization within a network comprising a plurality of nodes using a time source; receiving an indication regarding at least one of degradation or failure of the time source for at least one node; receiving an indication regarding at least recovery of the time source for the at least one node; and determining, within the network, an action to be taken to upon failure at the at least one node in response to the at least one of the degradation or the failure of the time source for the at least one node, where the action to be taken comprises instructing the at least one node to leverage either hold over functionality or a backup time source.

20 Claims, 11 Drawing Sheets

(56) References Cited

U.S. PATENT DOCUMENTS

| | | | |
|---|---|---|---|
| 7,783,913 B2 * | 8/2010 | Carlson | H04J 3/0641 |
| | | | 714/55 |
| 9,520,860 B2 * | 12/2016 | Whitehead | H04J 3/0644 |
| 9,973,601 B2 * | 5/2018 | Spada | H04J 3/0641 |
| 10,447,532 B2 * | 10/2019 | Crabtree | G06F 1/14 |
| 11,402,451 B2 * | 8/2022 | Moor | G01R 33/422 |
| 2012/0105112 A1 * | 5/2012 | Davis | G06F 11/1604 |
| | | | 327/142 |
| 2014/0111377 A1 | 4/2014 | Achanta et al. | |
| 2016/0099803 A1 | 4/2016 | Achanta et al. | |
| 2019/0114235 A1 * | 4/2019 | Wojewoda | G06F 11/1604 |
| 2021/0006344 A1 * | 1/2021 | Chen | G01S 19/14 |

OTHER PUBLICATIONS

Meinberg, "Meingberg PTP Track Hound", Retrieved via the Wayback Machine on Apr. 24, 2023, <URL:https://web.archive.org/web/20210916090619/https://www.meinbergglobal.com/english/sw/ptp-track-hound.htm>, (Sep. 16, 2021), 2 pages.

Novatel, "GRIT—GNSS Resilience and Integrity Technology", Retrieved via the Wayback Machine on Apr. 24, 2023, <URL:https://web.archive.org/web/20210921143442/https://novatel.com/products/grit>, (Sep. 21, 2021), 4 pages.

* cited by examiner

| Network element | Location | Time source ID(s) | Holdover |
|---|---|---|---|
| NG-RAN node 1 | TAIs or or geographic area X | PTP GM clock identity (defaultDS.clockIdentity) | Time interval: Z Time error: function Y |
| | | GPS (gnss-TimeID) | |
| NG-RAN node 2 | TAIs or or geographic area W | Galileo (gnss-TimeID) | YY PPM frequency stability |
| UPF #1 | UPF #1 Serving area X | PTP GM clock identity | Time interval: Z, Time error: function Y |

FIG. 4

TIME SOURCE HEALTH MONITORING SUPPORT FOR NETWORK TIMING RESILIENCY

CROSS-REFERENCE TO RELATED APPLICATIONS

This application claims priority to U.S. Provisional Patent Application Ser. No. 63/261,796 filed on Sep. 29, 2021, the contents of which are hereby incorporated by reference in their entirety.

TECHNOLOGICAL FIELD

An example embodiment relates generally to techniques for monitoring time sources for nodes of a network and providing timing resiliency solutions in the event of time source degradation or failure.

BACKGROUND

Synchronization timing in a network is crucial to the proper functionality of the network. Various aspects of network functionality rely upon network time synchronization. User equipment devices operating on a network rely on timing signals from nodes, and those nodes require timing signals from common, reliable sources. When a timing signal fails to reach a node, or is degraded or erroneous when received at a node, functionality of user equipment devices connected to that node is compromised. Timing errors result in network connection errors along with application functionality issues. Therefore, it is important to maintain synchronous timing among nodes of a network, regardless of the time source for each node of the network.

BRIEF SUMMARY

Various embodiments generally relate to techniques for monitoring time sources for nodes of a network and providing timing resiliency solutions in the event of time source degradation or failure. Certain embodiments provided herein include an apparatus including at least one processor; and at least one memory including computer program code, the at least one memory and computer program code configured to, with the at least one processor, cause the apparatus to: establish time synchronization within a network comprising a plurality of nodes using a time source; receive an indication regarding at least one of degradation or a failure of the time source for at least one node; receive an indication regarding at least recovery of the time source for the at least one node; and determine, within the network, an action to be taken upon failure at the at least one node in response to the at least one of the degradation or the failure of the time source for the at least one node, where the action to be taken comprises instructing the at least one node to leverage either hold over functionality or a backup time source.

According to an example embodiment, the network includes a fifth-generation technology standard (5G) network, and where the plurality of nodes includes one or more of a Next Generation Radio Access Network (NG-RAN) node, one or more of a Time Sensitive Communication and Time Synchronization Function (TSCTSF), or one or more of a Universal Plane Function (UPF). According to an example embodiment, the time source includes at least one of a Global Navigation Satellite System (GNSS) time source and a Packet Transfer Protocol (PTP) time source. A health of the time source is, in some embodiments, monitored using at least one of GNSS reports or PTP reports fed into a core of the 5G network. According to an example embodiment, a health of the time source is provided in an event notification from the at least one node, wherein the event notification comprises at least one of a degradation of time source event, failure of time source event, use of hold over capability, use of back up time source event when original time source fails, or recovery of time source event.

According to an example embodiment, the indication of at least one of a degradation or a failure of the time source for the at least one node is received from a Network Data Analytics Function. The action to be taken, in some embodiments, is determined based, at least in part, on an area impacted by the at least one of the degradation or the failure of the time source at the at least one node. The action to be taken, in some embodiments, further includes causing the apparatus to provide instruction to the at least one node to handover any served user equipment devices to another of the plurality of nodes having a reliable time source. The action to be taken further comprises, in some embodiments, causing the apparatus to provide a list of nodes of the plurality of nodes having a reliable time source. The apparatus of an example embodiment is further caused to collect data from the network to determine capabilities for timing resilience, hold over functionality, or access to backup time source, where the action to be taken to restore the time signal is determined based on the collected data from the network. According to some embodiments, causing the apparatus to collect data from the network includes causing the apparatus to collect data from the network to build a time source database to manage timing resiliency.

Other embodiments provided herein include an apparatus including: at least one processor; and at least one memory including computer program code, the at least one memory and the computer program code configured to, with the at least one processor, cause the apparatus to at least: receive a time-synchronization dependent service request from a user equipment (UE) operating on a network; determine an area-of-interest for the service request and a plurality of nodes supporting the network in the area-of-interest; detect a time-synchronization issue compromising a time source of at least one node of the plurality of nodes; determine a time-synchronization issue response; and cause operation of at least one of the user equipment or the at least one node according to the time-synchronization issue response. The time-synchronization issue of some embodiments includes at least one of a degradation or a failure of the time source for the at least one node.

According to some embodiments, the time-synchronization issue response includes causing the apparatus to cause at least one node to implement a time-synchronization response based on a response plan stored locally at the node. The time-synchronization issue response includes, in some embodiments, causing the apparatus to provide a command to the at least one node to update reference time information uncertainty. The time-synchronization issue response includes, in some embodiments, causing the apparatus to provide a command to the at least one node to switch to a new available time source. The time synchronization issue response includes, in some embodiments, causing the apparatus to provide an instruction to the at least one node to handover served UEs to other nodes of the plurality of nodes, where the other nodes are identified as having correct time-synchronization.

Additional embodiments provided herein include an apparatus including: at least one processor; and at least one memory including computer program code, the at least one memory and the computer program code configured to, with the at least one processor, cause the apparatus to: cause transmission of a request for a time-synchronization dependent service to a network supported by a plurality of nodes; engage a node of the plurality of nodes for operation of the time-synchronization dependent service; receive an indication of a time-synchronization issue with the node of the plurality of nodes; receive an indication of a handover from the node of the plurality of nodes to a different node of the plurality of nodes; and continue operation of the time-synchronization dependent service with the different node.

According to an example embodiment, the indication of a handover from the node of the plurality of nodes to the different node of the plurality of nodes includes an indication of a subset of nodes of the plurality of nodes having a reliable time source. According to an example embodiment, the network includes a fifth-generation technology standard (5G) network, and where the plurality of nodes includes one or more of a NG Radio Access Network (NG-RAN) node or one or more of a Universal Plane Function (UPF).

Certain embodiments provided herein include a method including: establishing time synchronization within a network comprising a plurality of nodes using a time source; receiving an indication regarding at least one of a degradation or a failure of the time source for at least one node; receiving an indication regarding at least recovery of the time source for the at least one node; and determining, within the network, an action to be taken upon failure at the at least one node in response to the at least one of the degradation or the failure of the time source for the at least one node, where the action to be taken comprises instructing the at least one node to leverage either hold over functionality or a backup time source. According to some embodiments the network includes a fifth-generation technology standard (5G) network, and where the plurality of nodes include one or more of a NG Radio Access Network (NG-RAN) node, one or more of Time Sensitive Communication and Time Synchronization Function (TSCTSF), or one or more of a Universal Plane Function (UPF). The time source includes, in some embodiments, at least one of a Global Navigation Satellite System (GNSS) time source and a Packet Transfer Protocol (PTP) time source. According to some embodiments, a health of the time source is monitored using at least one of GNSS reports or PTP reports fed into a core of the 5G network.

According to some embodiments, a health of the time source is provided in an event notification from the at least one node, where the event notification includes at least one of a degradation of time source event, failure of time source event, use of hold over capability, use of back up time source event when original source fails or recovery of time source event. According to some embodiments, the indication of at least one of a degradation or a failure of the time source for the at least one node is received from a Network Data Analytics Function. The action to be taken is determined, in some embodiments, based, at least in part, on an area impacted by the at least one of the degradation or the failure of the time source at the at least one node. The action to be taken further includes, in some embodiments, providing instruction to the at least one node to handover any served user equipment devices to another of the plurality of nodes having a reliable time source. The action to be taken further includes, in some embodiments, providing a list of nodes of the plurality of nodes having a reliable time source. Methods optionally include collecting data from the network to determine capabilities for timing resilience, hold over functionality, and access to backup time source, where the action to be taken to restore the time signal is determined based on the collected data from the network. Collecting data from the network includes, in some embodiments, collecting data from the network to build a time source database to manage timing resiliency.

Some embodiments provided herein include a method including: receiving a time-synchronization dependent service request from a user equipment (UE) operating on a network; determining an area-of-interest for the service request and a plurality of nodes supporting the network in the area-of-interest; detecting a time-synchronization issue compromising a time source of at least one node of the plurality of nodes; determining a time-synchronization issue response; and causing operation of at least one of the user equipment or the at least one node according to the time-synchronization issue response. The time-synchronization issue includes, in some embodiments, at least one of a degradation or a failure of the time source for the at least one node.

The time-synchronization issue response includes, in some embodiments, causing the at least one node to implement a time-synchronization response based on a response plan stored locally at the node. According to some embodiments, the time-synchronization issue response includes providing a command to the at least one node to update reference time information uncertainty. According to some embodiments, the time-synchronization issue response includes providing a command to the at least one node to operate in a hold over mode. The time-synchronization issue response includes, in some embodiments, providing a command to the at least one node to switch to a new available time source. The time-synchronization issue response includes, in some embodiments, providing an instruction to the at least one node to handover served UEs to other nodes of the plurality of nodes, where the other nodes are identified as having correct time-synchronization.

Other embodiments provided herein include a method including: causing transmission of a request for a time-synchronization dependent service to a network supported by a plurality of nodes; engaging a node of the plurality of nodes for operation of the time-synchronization dependent service; receiving an indication of a time-synchronization issue with the node of the plurality of nodes; receiving an indication of a handover from the node of the plurality of nodes to a different node of the plurality of nodes; and continuing operation of the time-synchronization dependent service with the different node. The indication of a handover from the node of the plurality of nodes to the different node of the plurality of nodes includes, in some embodiments, an indication of a subset of nodes of the plurality of nodes having a reliable time source. The network, in some embodiments, includes a fifth-generation technology standard (5G) network, and wherein the plurality of nodes comprises one or more of a NG Radio Access Network (NG-RAN) node or one or more of a Universal Plane Function (UPF).

Certain embodiments provided herein include a computer program product including at least one non-transitory computer readable storage medium having computer executable program code instructions stored therein, the computer executable program code instructions including program code instructions configured, upon execution, to: establish time synchronization within a network comprising a plurality of nodes using a time source; receive an indication regarding at least one of a degradation or a failure of the time source for at least one node; receive an indication regarding at least recovery of the time source for the at least one node; and determine, within the network, an action to be taken upon failure at the at least one node in response to the at least one of the degradation or the failure of the time source for the at least one node, where the action to be taken comprises provision of a synchronization time signal to the at least one node. According to some embodiments, the network includes a fifth-generation technology standard (5G) network, and wherein the plurality of nodes comprises one or more of a NG Radio Access Network (NG-RAN) node, one or more of Time Sensitive Communication and Time Synchronization Function (TSCTSF), or one or more of a Universal Plane Function (UPF).

According to some embodiments, the time source includes at least one of a Global Navigation Satellite System (GNSS) time source and a Packet Transfer Protocol (PTP) time source. According to some embodiments, a health of the time source is monitored using at least one of GNSS reports or PTP reports fed into a core of the 5G network. A health of the time source is, in some embodiments, provided in an event notification from the at least one node, where the event notification includes at least one of a degradation of time source event, failure of time source event, use of hold over capability, use of back up time source event when original source fails or recovery of time source event. According to some embodiments, the indication of at least one of a degradation or a failure of the time source for the at least one node is received from a Network Data Analytics Function.

According to some embodiments, the action to be taken is determined based, at least in part, on an area impacted by the at least one of the degradation or the failure of the time source at the at least one node. The action to be taken further includes, in some embodiments, program code instructions to provide instruction to the at least one node to handover any served user equipment devices to another of the plurality of nodes having a reliable time source. The action to be taken further includes, in some embodiments, program code instructions to provide a list of nodes of the plurality of nodes having a reliable time source. According to an example embodiment, the computer program product further includes program code instructions to collect data from the network to determine capabilities for timing resilience, hold over functionality, or access to backup time source, wherein the action to be taken to restore the time signal is determined based on the collected data from the network. The program code instructions to collect data from the network includes, in some embodiments, program code instructions to collect data from the network to build a time source database to manage timing resiliency.

Other embodiments provided herein include a computer program product including at least one non-transitory computer readable storage medium having computer executable program code instructions stored therein, the computer executable program code instructions including program code instructions configured to, upon execution: receive a time-synchronization dependent service request from a user equipment (UE) operating on a network; determine an area-of-interest for the service request and a plurality of nodes supporting the network in the area-of-interest; detect a time-synchronization issue compromising a time source of at least one node of the plurality of nodes; determine a time-synchronization issue response; and cause operation of at least one of the user equipment or the at least one node according to the time-synchronization issue response. According to some embodiments, the time-synchronization issue includes at least one of a degradation or a failure of the time source for the at least one node.

According to an example embodiment, the time-synchronization issue response includes program code instructions to cause the at least one node to implement a time-synchronization response based on a response plan stored locally at the node. The time-synchronization issue response includes, in some embodiments, program code instructions to provide a command to the at least one node to update reference time information uncertainty. The time-synchronization issue response includes, in some embodiments, program code instructions to provide a command to the at least one node to operate in a hold over mode. The time-synchronization issue response includes, in some embodiments, program code instructions to provide a command to the at least one node to switch to a new available time source. The time-synchronization issue response includes, in some embodiments, program code instructions to provide an instruction to the at least one node to handover served UEs to other nodes of the plurality of nodes, where the other nodes are identified as having correct time-synchronization.

Some embodiments provided herein include a computer program product including at least one non-transitory computer readable storage medium having computer executable program code instructions stored therein, the computer executable program code instructions including program code instructions configured, upon execution, to: cause transmission of a request for a time-synchronization dependent service to a network supported by a plurality of nodes; engage a node of the plurality of nodes for operation of the time-synchronization dependent service; receive an indication of a time-synchronization issue with the node of the plurality of nodes; receive an indication of a handover from the node of the plurality of nodes to a different node of the plurality of nodes; and continue operation of the time-synchronization dependent service with the different node. According to some embodiments, the indication of a handover from the node of the plurality of nodes to the different node of the plurality of nodes includes an indication of a subset of nodes of the plurality of nodes having a reliable time source. According to some embodiments, the network comprises a fifth-generation technology standard (5G) network, and wherein the plurality of nodes comprises one or more of a NG Radio Access Network (NG-RAN) node or one or more of a Universal Plane Function (UPF).

Certain embodiments provided herein include an apparatus including: means for establishing time synchronization within a network comprising a plurality of nodes using a time source; means for receiving an indication regarding at least one of a degradation or a failure of the time source for at least one node; means for receiving an indication regarding at least recovery of the time source for the at least one node; and means for determining, within the network, an action to be taken upon failure at the at least one node in response to the at least one of the degradation or the failure of the time source for the at least one node, where the action to be taken comprises instructing the at least one node to leverage either hold over functionality or a backup time source. According to some embodiments, the network comprises a fifth-generation technology standard (5G) network, and wherein the plurality of nodes includes one or more of a NG Radio Access Network (NG-RAN) node, one or more of Time Sensitive Communication and Time Synchronization Function (TSCTSF), or one or more of a Universal Plane Function (UPF). According to some embodiments, the time source includes at least one of a Global Navigation Satellite System (GNSS) time source and a Packet Transfer Protocol (PTP) time source.

According to an example embodiment, a health of the time source is monitored using at least one of GNSS reports or PTP reports fed into a core of the 5G network. According to some embodiments, a health of the time source is provided in an event notification from the at least one node, where the event notification comprises at least one of a degradation of time source event, failure of time source event, use of hold over capability, use of back up time source event when original source fails or recovery of time source event. The indication of at least one of a degradation or a failure of the time source for the at least one node is, in some embodiments, received from a Network Data Analytics Function. The action to be taken is determined, in some embodiments, based at least in part on an area impacted by the at least one of the degradation or the failure of the time source at the at least one node. According to some embodiments, the action to be taken further includes providing instruction to the at least one node to handover any served user equipment devices to another of the plurality of nodes having a reliable time source. The action to be taken further includes, in some embodiments, providing a list of nodes of the plurality of nodes having a reliable time source. The apparatus of an example embodiment further includes means for collecting data from the network to determine capabilities for timing resilience, hold over functionality, or access to backup time source, wherein the action to be taken to restore the time signal is determined based on the collected data from the network. The means for collecting data from the network includes, in some embodiments, means for collecting data from the network to build a time source database to manage timing resiliency.

Some embodiments provided herein include an apparatus including: means for receiving a time-synchronization dependent service request from a user equipment (UE) operating on a network; means for determining an area-of-interest for the service request and a plurality of nodes supporting the network in the area-of-interest; means for detecting a time-synchronization issue compromising a time source of at least one node of the plurality of nodes; means for determining a time-synchronization issue response; and means for causing operation of at least one of the user equipment or the at least one node according to the time-synchronization issue response.

According to some embodiments, the time-synchronization issue includes at least one of a degradation or a failure of the time source for the at least one node. According to some embodiments, the time-synchronization issue response includes means for causing the at least one node to implement a time-synchronization response based on a response plan stored locally at the node. The time-synchronization issue response includes, in some embodiments, means for providing a command to the at least one node to update reference time information uncertainty. The time-synchronization issue response includes, in some embodiments, means for providing a command to the at least one node to operate in a hold over mode. The time-synchronization issue response includes, in some embodiments, means for providing a command to the at least one node to switch to a new available time source. According to some embodiments, the time-synchronization issue response includes means for providing an instruction to the at least one node to handover served UEs to other nodes of the plurality of nodes, wherein the other nodes are identified as having correct time-synchronization.

Additional embodiments provided herein include an apparatus including: means for causing transmission of a request for a time-synchronization dependent service to a network supported by a plurality of nodes; means for engaging a node of the plurality of nodes for operation of the time-synchronization dependent service; means for receiving an indication of a time-synchronization issue with the node of the plurality of nodes; means for receiving an indication of a handover from the node of the plurality of nodes to a different node of the plurality of nodes; and means for continuing operation of the time-synchronization dependent service with the different node. The indication of a handover from the node of the plurality of nodes to the different node of the plurality of nodes includes, in some embodiments, an indication of a subset of nodes of the plurality of nodes having a reliable time source. According to some embodiments, the network includes a fifth-generation technology standard (5G) network, and wherein the plurality of nodes comprises one or more of a NG Radio Access Network (NG-RAN) node or one or more of a Universal Plane Function (UPF).

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1:
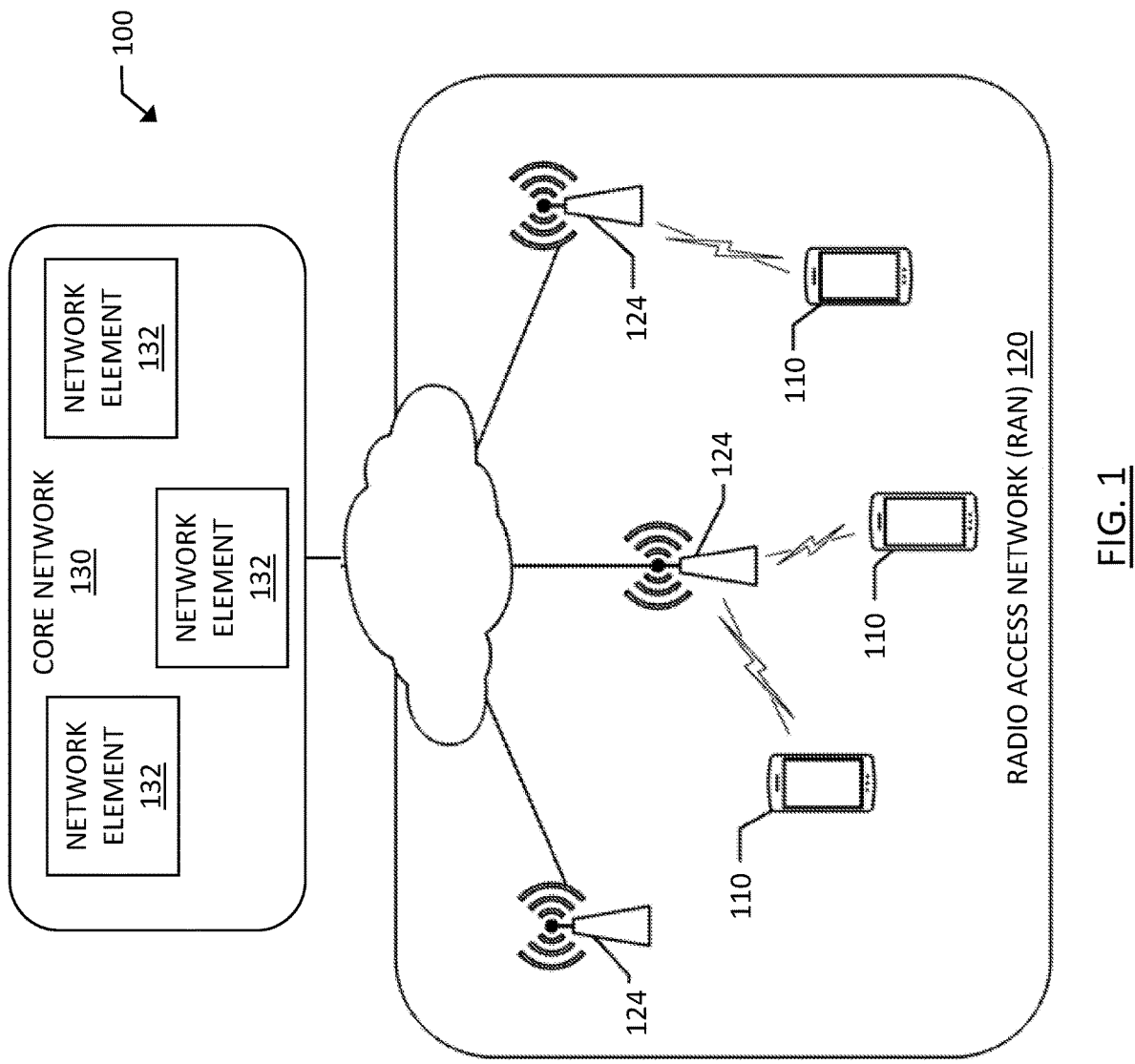

Having thus described certain example embodiments of the present disclosure in general terms above, non-limiting and non-exhaustive embodiments of the subject disclosure will now be described with reference to the accompanying drawings, which are not necessarily drawn to scale. The components illustrated in the accompanying drawings may or may not be present in certain embodiments described herein. Some embodiments may include fewer (or more) components than those shown in the drawings.

Figure 2:
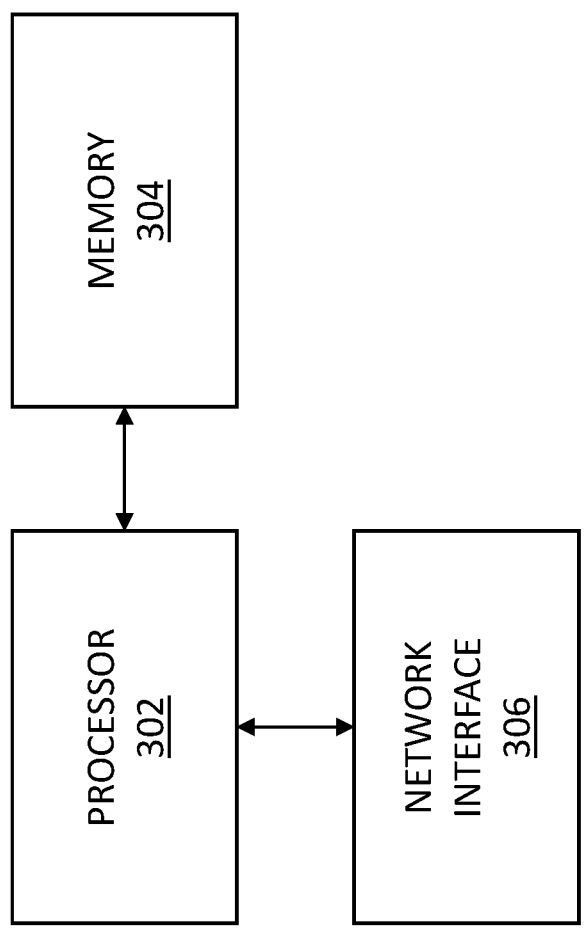
Figure 3:
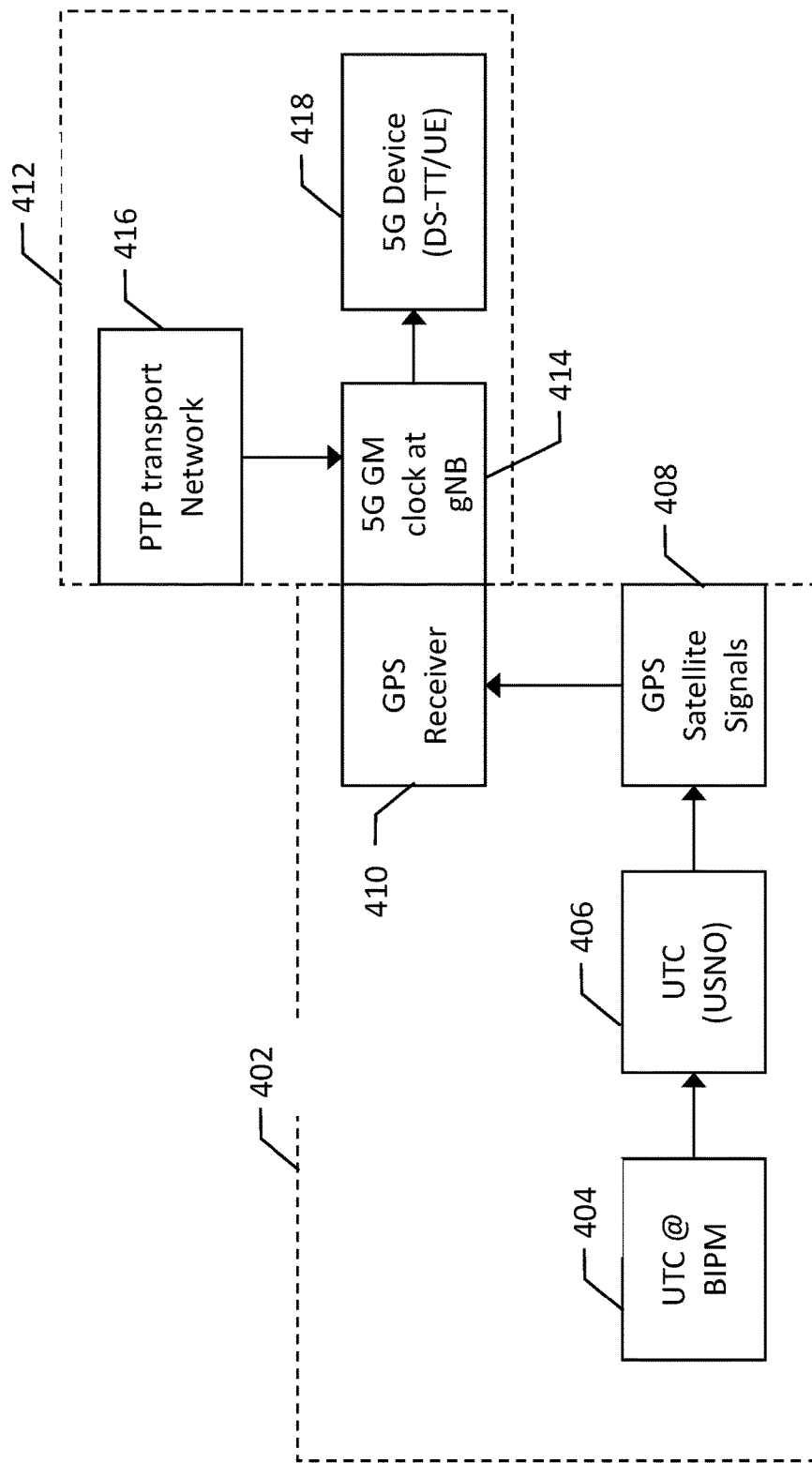
Figure 5:
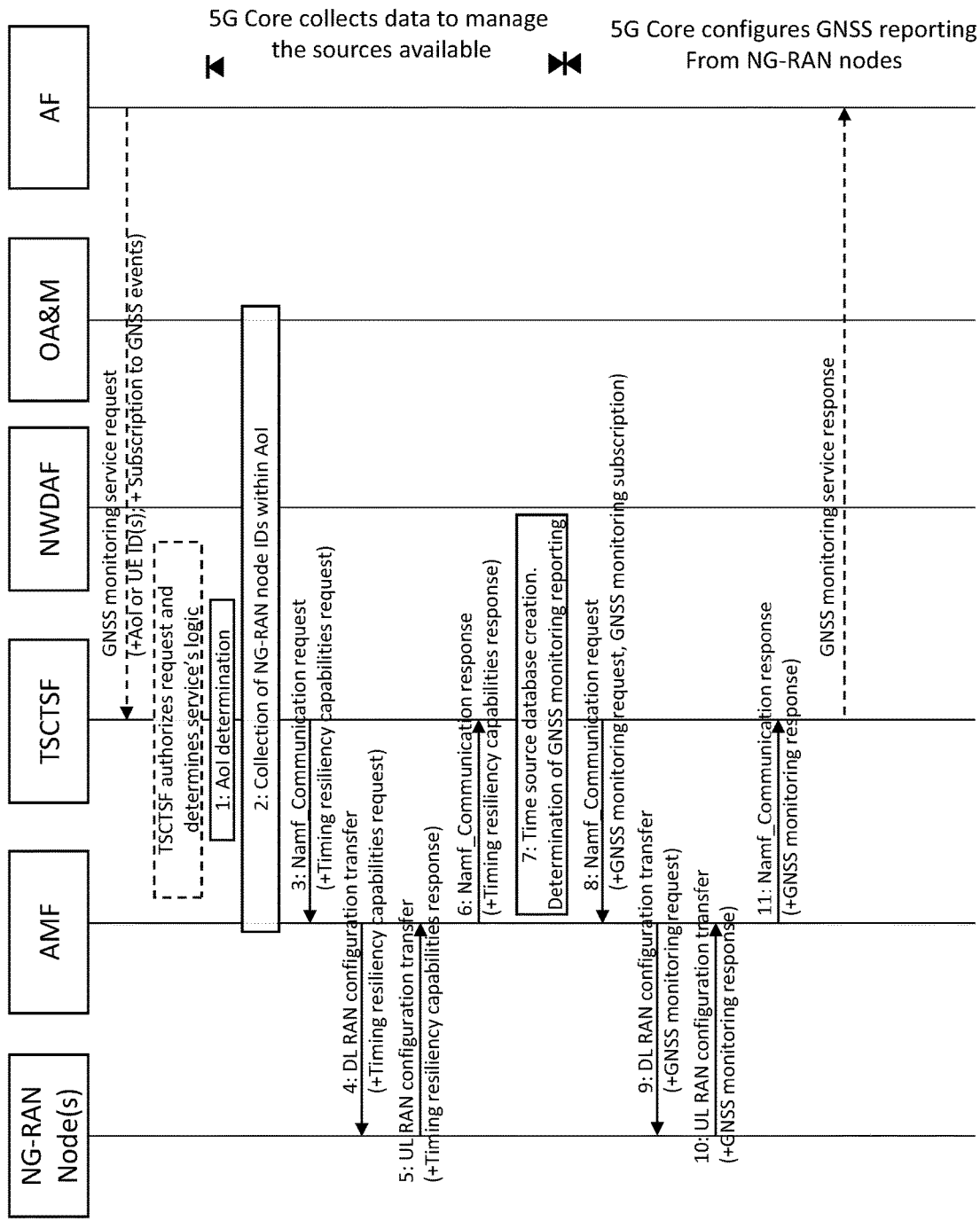
Figure 6:
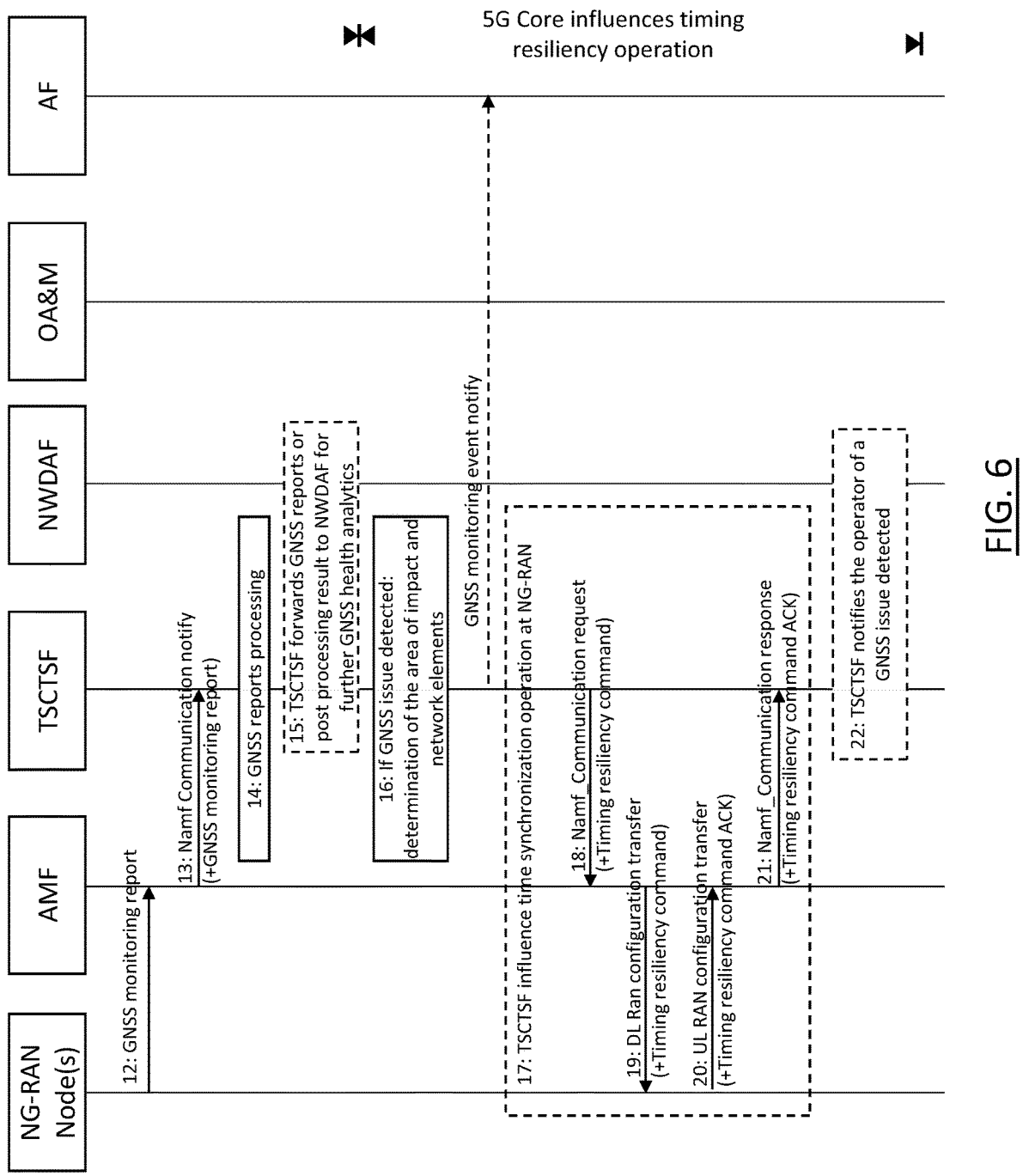
Figure 7:
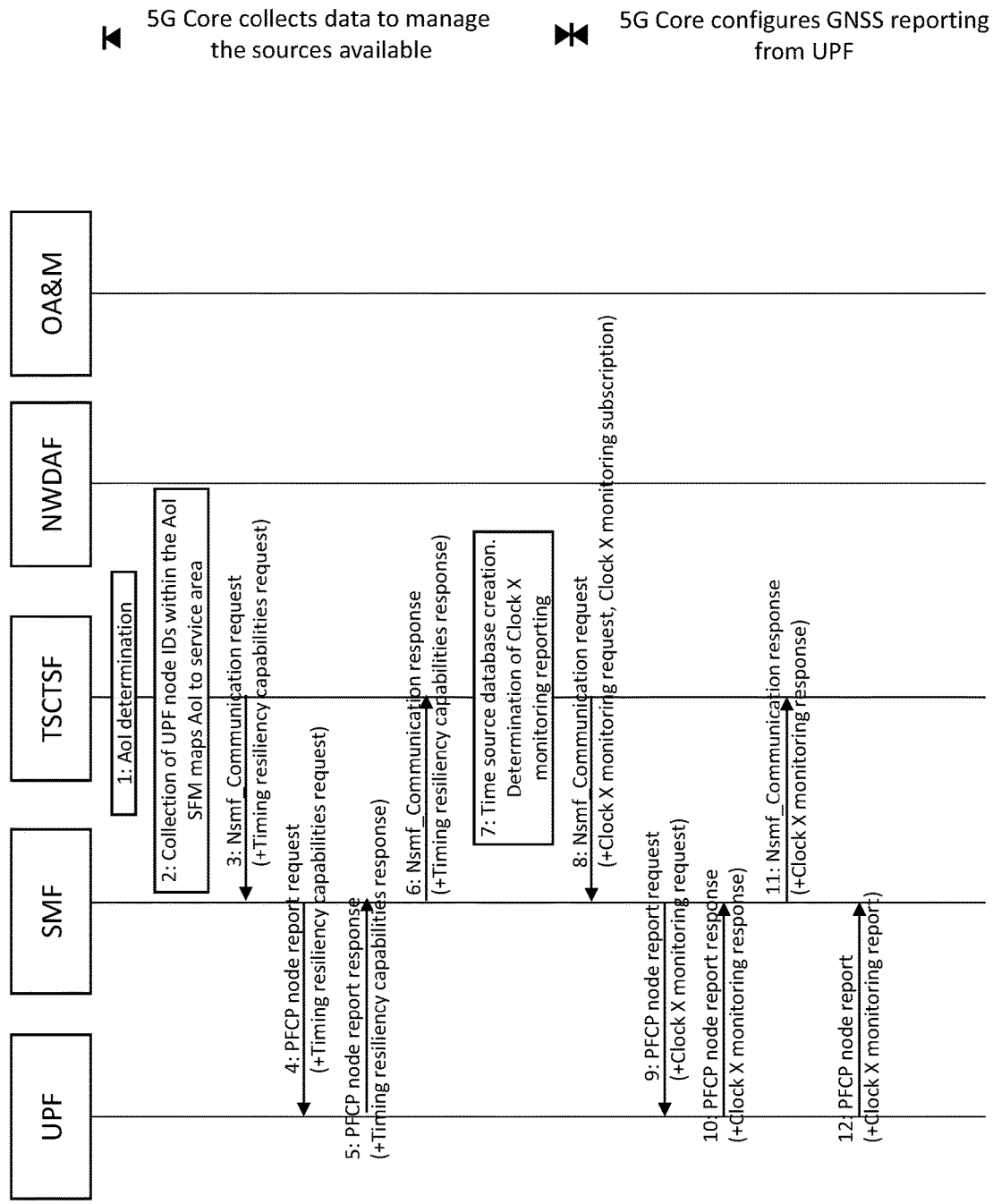
Figure 8:
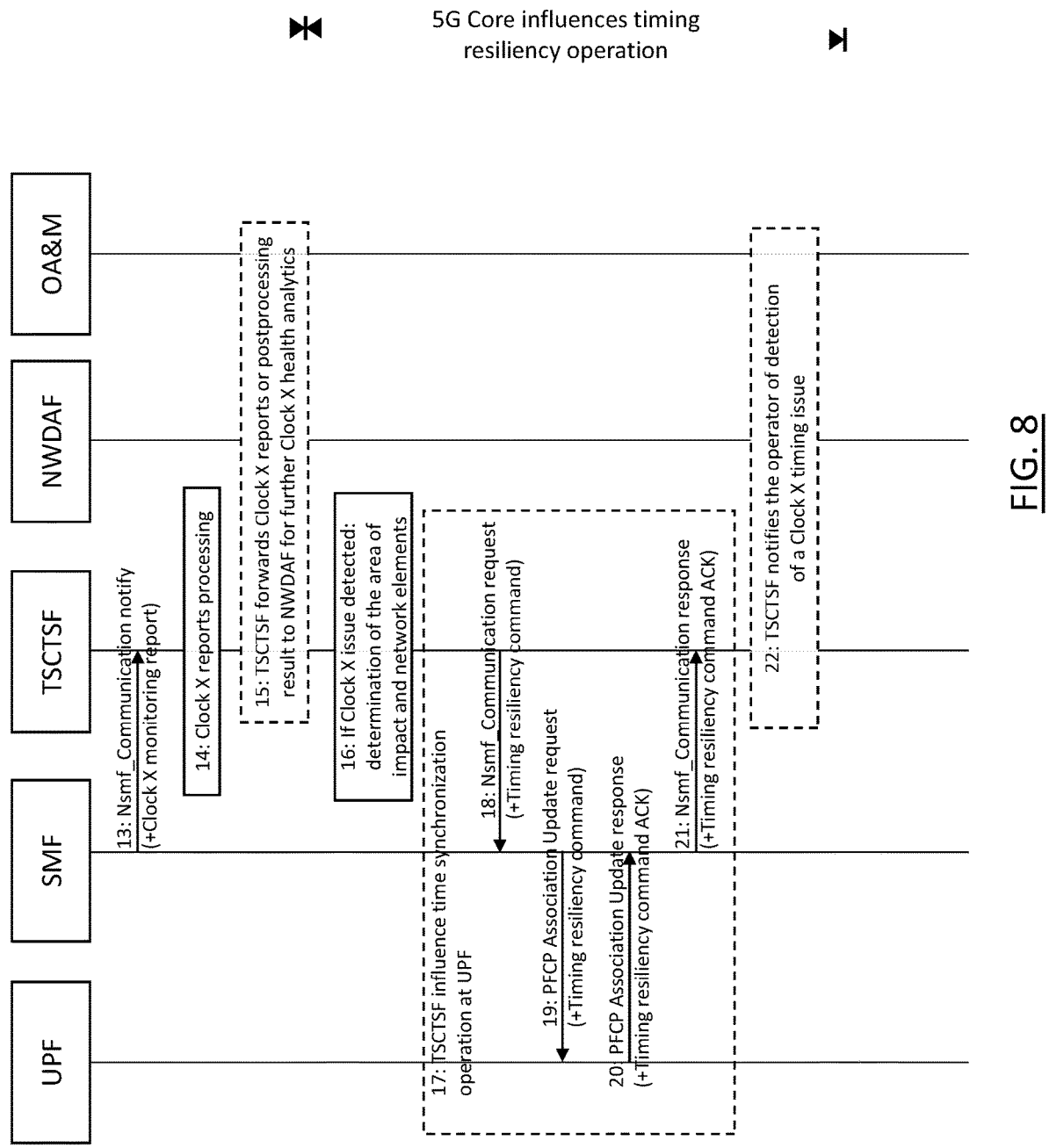
Figure 9:
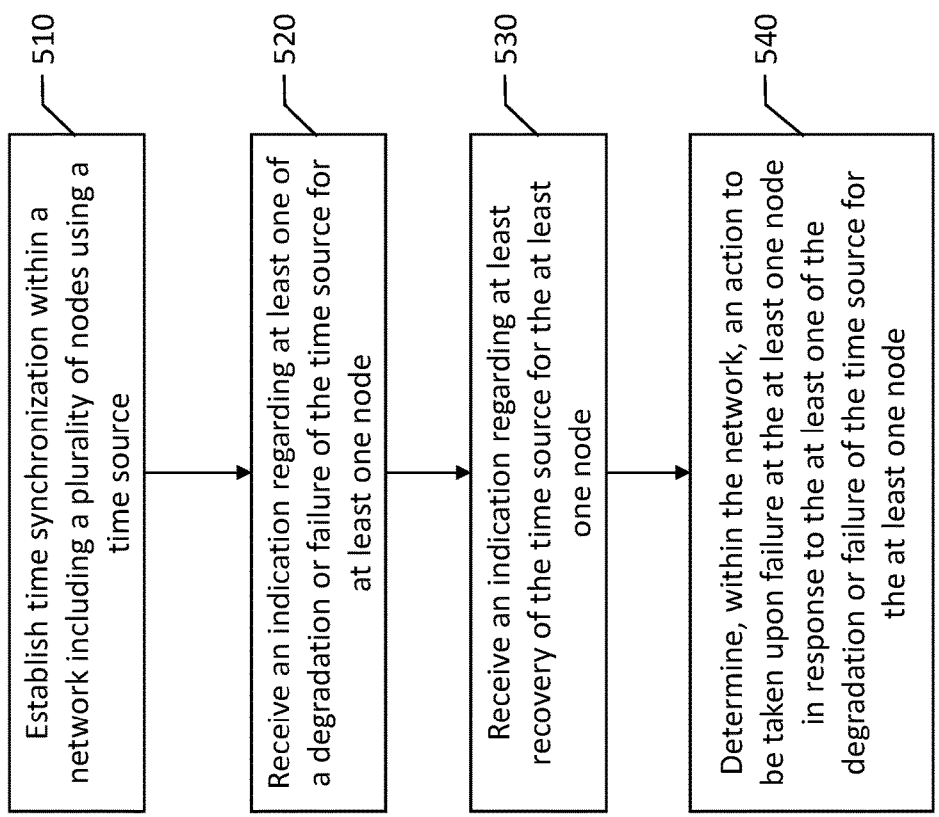
Figure 10:
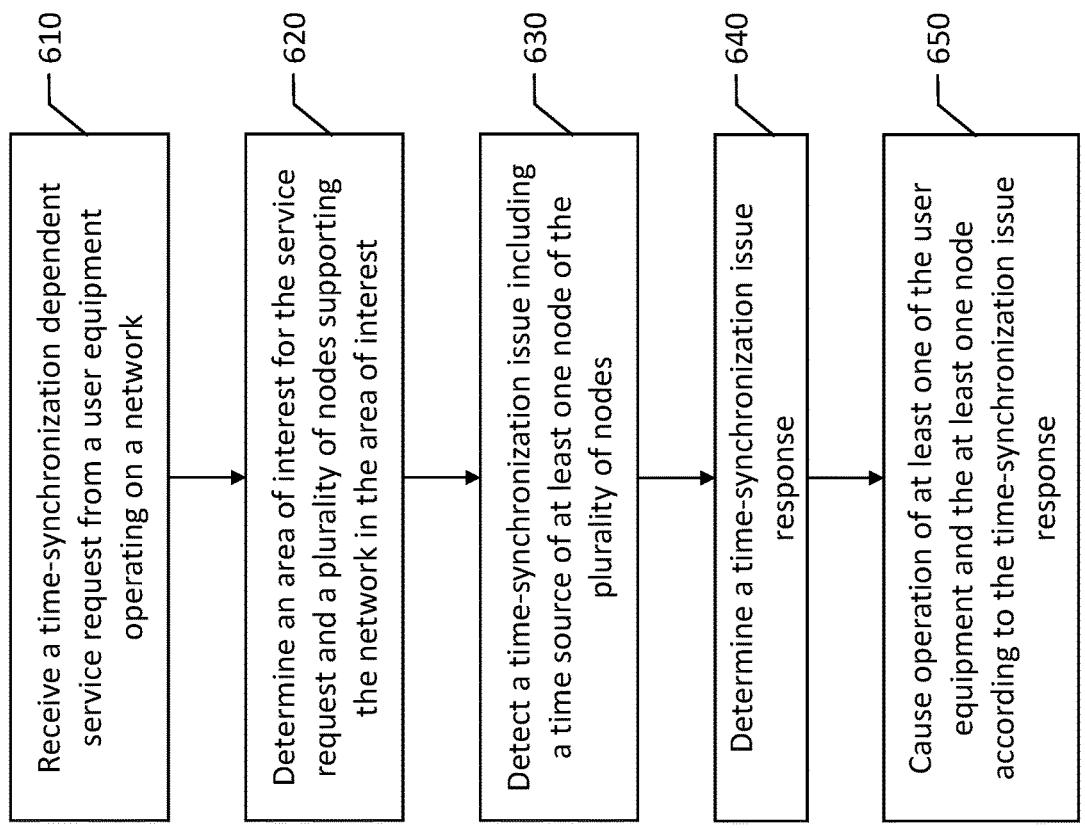
Figure 11:
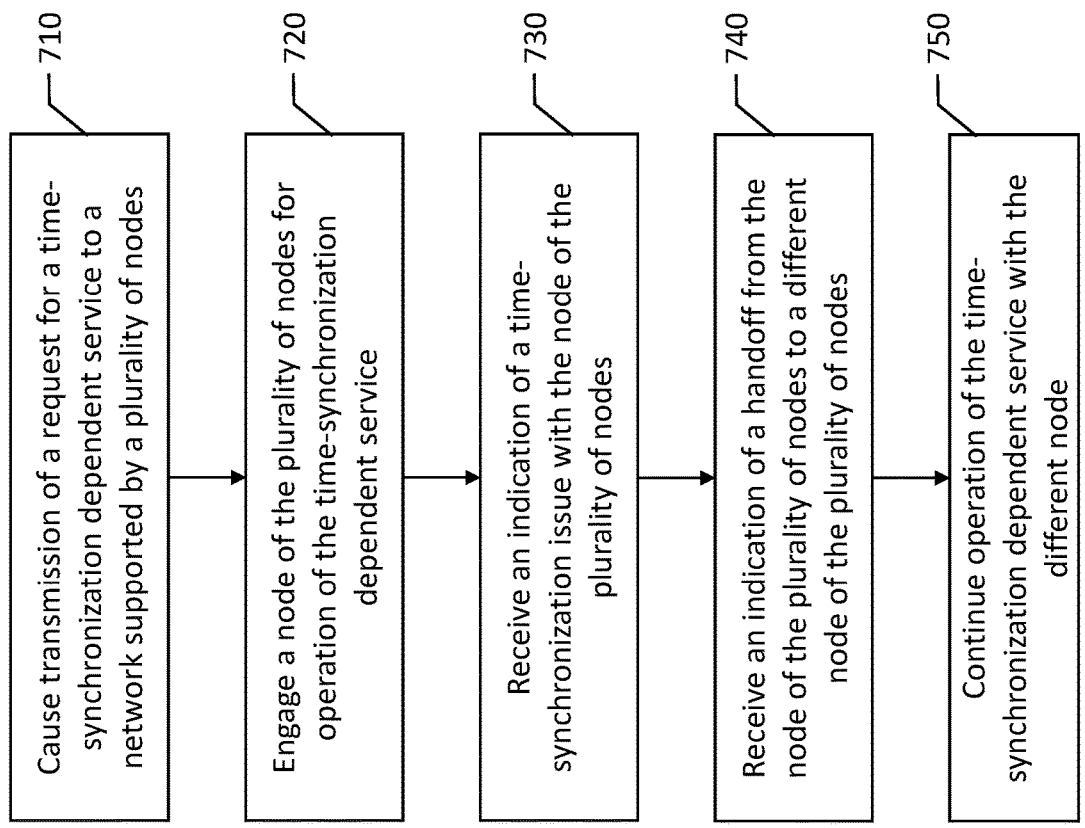

FIG. 1 illustrates an overview of an example mobile network (e.g., 5GS), in accordance with various embodiments;

FIG. 2 provides a block diagram of an example apparatus that may facilitate fault-tolerant time signal degradation through a mitigation framework, in accordance with various embodiments;

FIG. 3 illustrates GNSS integration at gNB for establishing time synchronization, in accordance with various embodiments;

FIG. 4 illustrates a table of a time source database with a minimum set of information, in accordance with various embodiments;

FIGS. 5 and 6 illustrate a message flow diagram for GNSS monitoring of NG-RAN nodes according to an example embodiment of the present disclosure;

FIGS. 7 and 8 illustrate a message flow diagram for PTP clock input monitoring of UPF nodes according to an example embodiment of the present disclosure;

FIG. 9 is a flowchart of a technique for monitoring time sources for nodes of a network and providing timing resiliency solutions in the event of time source degradation or failure according to an example embodiment of the present disclosure;

FIG. 10 is a flowchart of another technique for monitoring time sources for nodes of a network and providing timing resiliency solutions in the event of time source degradation or failure according to an example embodiment of the present disclosure; and FIG. 11 is a flowchart of still another technique for monitoring time sources for nodes of a network and providing timing resiliency solutions in the event of time source degradation or failure according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," "electronic information," "signal," "command," and similar terms may be used interchangeably to refer to data capable of being captured, transmitted, received, and/or stored in accordance with various embodiments of the present disclosure. Thus, use of any such terms should not be taken to limit the spirit and scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, repeaters, and/or the like, sometimes referred to herein as a "network." Similarly, where a first computing device is described herein as sending data to a second computing device, it will be appreciated that the data may be sent or transmitted directly to the second computing device or may be sent or transmitted indirectly via one or more intermediary computing devices, such as, for example, one or more servers, remote servers, cloud-based servers (e.g., cloud utilities), relays, routers, network access points, base stations, hosts, repeaters, and/or the like.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of Furthermore, to the extent that the terms "includes" and "including," and variants thereof are used in either the detailed description or the claims, these terms are intended to be inclusive in a manner similar to the term "comprising."

The phrases "in one embodiment," "according to one embodiment," "in some embodiments," "in various embodiments", and the like generally refer to the fact that the particular feature, structure, or characteristic following the phrase may be included in at least one embodiment of the present disclosure, but not necessarily all embodiments of the present disclosure. Thus, the particular feature, structure, or characteristic may be included in more than one embodiment of the present disclosure such that these phrases do not necessarily refer to the same embodiment.

As used herein, the terms "example," "exemplary," and the like are used to mean "serving as an example, instance, or illustration." Any implementation, aspect, or design described herein as "example" or "exemplary" is not necessarily to be construed as preferred or advantageous over other implementations, aspects, or designs. Rather, use of the terms "example," "exemplary," and the like are intended to present concepts in a concrete fashion.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Examples of non-transitory computer-readable media may include, but are not limited to, one or more types of hardware memory, non-transitory tangible media (for example, one or more magnetic storage disks, one or more optical disks, one or more USB flash drives), computer system memory or random-access memory (such as, DRAM, SRAM, EDO RAM), and the like.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

Telecommunications networks generally employ a combination of synchronization methods to ensure reliability and robustness of phase/time synchronization, such as to avoid causing the RAN (Radio Access Network) timing to fail and to interfere with other nodes and devices. For example, local GNSS (Global Navigation Satellite System) receivers at RAN nodes combine with a PTP (Precision Time Protocol) transport network to support a GNSS-based physical layer clock located more centrally. In an example, according to International Telecom Union (ITU) standard ITU-T G8271.2, network limits are defined for time synchronization in packet networks with partial timing support from the network. In the Assisted Partial Timing Support (APTS) configuration, PTP is used as a backup timing source to a local reference (e.g., primary reference time clock (PRTC) based on the GNSS) for durations up to 72 hours. PTP is not intended to be used as the primary timing source. In the PTS configuration, however, PTP is used as the primary source of time to the end application. In such a mode, a local time reference (e.g., GNSS) is not available.

Some examples of the requirements that a RAN needs to fulfill include Cell phase sync accuracy (CPSA) of 3 microseconds among cells for TDD (Time Division Duplexing), and time alignment error between gNB (gNodeB) radio units (RUs) of less than 260 nanoseconds (category B) and 130 nanoseconds (category A) for Intra-band Carrier Aggregation. However, the GNSS signal is prone to degradation, such as due to physical blockage, interference, and threats such as jamming/spoofing attacks that can compromise network synchronization. The gNB is a well-suited network element to monitor GNSS signals, though it may have different implementations, such as whether the gNB relies on a directly attached GNSS or whether it connects to its timing master over a transport network.

Certain embodiments described herein provide enablers for a network system, such as a fifth-generation technology standard (5G) network system (5GS), to have a consistent, fault-tolerant degradation mitigation framework., such as a GNSS degradation mitigation framework When GNSS timing or any other time source employed by network elements (e.g., PTP) fails or otherwise degrades, it is generally desirable to maintain accurate timing at nodes within the network for proper synchronization among network elements and operation of devices on the network, such as user equipment (UE) devices (e.g., cellular phones). Employing certain embodiments described herein, synchronous timing is maintained among network elements when a time source, such as GNSS timing, fails or otherwise degrades.

Referring now to FIG. 1, an example mobile network 100 is illustrated. Mobile network 100 (also referred to as a cellular network) is a type of network where at least the last link is wireless, and provides timing, voice, and/or data services to a plurality of devices. Mobile network 100 may be a Third Generation (3G), a Fourth Generation (4G), and/or a next generation (e.g., Fifth Generation, or 5G) network or any other of a variety of networks.

Mobile network 100 is illustrated as providing communication services to UEs 110. UEs 110 may be enabled for voice services, data services, Machine-to-Machine (M2M) or Machine Type Communications (MTC) services, Internet of Things (IoT) services, and/or other services. A UE 110 may be an end user device such as a mobile phone (e.g., smartphone), a tablet or PDA, a computer with a mobile broadband adapter, and/or the like.

Mobile network 100 includes one or more radio access networks (RAN 120) that communicate with UEs 110 over a radio interface. RAN 120 of one example embodiment may support Evolved-UMTS terrestrial Radio Access network (E-UTRAN) access, Wireless Local Area Network (WLAN) access, fixed access, satellite radio access, new Radio Access Technologies (RAT), and/or the like. As an example, RAN 120 may comprise an E-UTRAN or Next Generation RAN (NG-RAN) that includes one or more base stations 124 that are dispersed over a geographic area. A base station 124 may comprise an entity that uses radio communication technology to communicate with a UE on the licensed spectrum, and interface the UE with a core network 130. Base stations 124 in an E-UTRAN may be referred to as Evolved-NodeBs (eNodeB). Base stations 124 in a NG-RAN may be referred to as gNodeBs (NR base stations) and/or ng-eNodeBs (LTE base stations supporting a 5G Core Network). As another example, RAN 120 may comprise a WLAN that includes one or more Wireless Access Points (WAP). A WLAN is a network in which a UE is able to connect to a Local Area Network (LAN) through a wireless (radio) connection. A WAP is a node that uses radio communication technology to communicate with a UE over the unlicensed spectrum and provides the UE access to a core network. One example of a WAP is a Wi-Fi access point that operates on the 2.4 GHz or 5 GHz radio bands. The term "base station" then may refer to an eNodeB, a gNodeB, an ng-eNodeB, a WAP, and/or the like.

UEs 110 are able to attach to a cell of a RAN 120 to access a core network 130. RAN 120 therefore represents the radio interface between UEs 110 and core network 130. Core network 130 is the central part of mobile network 100 that provides various services to customers who are connected by RAN 120. One example of core network 130 is the Evolved Packet Core (EPC) network as described by the 3GPP for LTE. Another example of core network 130 is a 5G Core (5GC) network as described by the 3GPP. Core network 130 includes network elements 132, which may comprise servers, devices, apparatuses, or equipment (including hardware) that provide services for UEs 110. Network elements 132, in an EPC network, may comprise a Mobility Management Entity (MME), a Service Gateway (S-GW), a Packet Data Network Gateway (P-GW), and/or the like. Network elements 132, in a 5G network, may comprise an Access and Mobility Management Function (AMF), a Session Management Function (SMF), a User Plane Function (UPF), a Policy Control Function (PCF), a Unified Data Management (UDM), and/or the like.

Referring now to FIG. 2, an example apparatus 300 is provided. The apparatus 300 may be an embodiment of a UE 110 and/or may be embodied by or otherwise associated with a UE 110, in some instances. Alternatively, the apparatus 300 may be an embodiment of a network element 132 or may be embodied by or otherwise associated with a network element 132, such as a PCF 260. In any regard, the apparatus 300 is configured to indicate and/or evaluate the applicability of routing parameters, such as URSP parameters. In an example embodiment, apparatus 300 is embodied by a network element 132, such as a PCF 260, and generates network applicability indications for parameters in a policy rule data object (e.g., a URSP) based at least in part on determining an applicability for the parameters to EPS networks. The apparatus 300 may then cause transmission of the policy rule data object including the network applicability indications to a UE 110, and the UE 110 may subsequently use the policy rule data object and evaluate the network applicability indications for the parameters of the policy rule data object in communicating via an EPS network. In another example embodiment, apparatus 300 is embodied by a UE 110 and receives a policy rule data object comprising network applicability indications associated with parameters. The apparatus 300 (e.g., UE 110) evaluates the network applicability indications to determine whether to ignore or consider various parameters and/or rule descriptors when communicating via an EPS network.

The apparatus 300 may include processor 302, memory 304, and network interface 306. The apparatus 300 may be configured to execute the operations described herein. Although these components are described with respect to the performance of various functions, it should be understood that the particular implementations necessarily include the use of particular hardware. It should also be understood that certain of these components may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may be configured to store information, data, content, applications, instructions, or the like for enabling the apparatus to carry out various functions in accordance with an example embodiment disclosed herein.

The processor 302 may be embodied in a number of different ways and may, for example, include one or more processing devices configured to perform independently. In some non-limiting embodiments, the processor 302 may include one or more processors configured in tandem via a bus to enable independent execution of instructions, pipelining, and/or multithreading. The use of the term "processor" may be understood to include a single core processor, a multi-core processor, multiple processors internal to the apparatus, and/or remote or "cloud" processors.

In some embodiments, the processor 302 may be configured to execute instructions stored in the memory 304 and/or circuitry otherwise accessible to the processor 302, such as instructions for indicating and evaluating EPS applicability of URSP parameters of a policy rule data object. In some embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment disclosed herein while configured accordingly. Alternatively, as another example, when the processor 302 is embodied as an executor of software instructions, the instructions may specifically configure the processor 302 to perform the algorithms and/or operations described herein when the instructions are executed.

In some embodiments, the apparatus 300 may include input/output circuitry that may, in turn, be in communication with processor 302 to provide output to a user and/or other entity and, in some embodiments, to receive an indication of an input. The input/output circuitry may comprise a user interface and may include a display, and may comprise a web user interface, a mobile application, a query-initiating computing device, a kiosk, or the like. In some embodiments, the input/output circuitry may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The network interface 306 may be any means such as a device or circuitry embodied in either hardware or a combination of hardware and software that is configured to receive and/or transmit data from/to a network and/or any other device, circuitry, or module in communication with the apparatus 300. In this regard, the network interface 306 may include, for example, a network interface for enabling communications with a wired or wireless communication network. For example, the network interface 306 may include one or more network interface cards, antennae, buses, switches, routers, modems, and supporting hardware and/or software, or any other device suitable for enabling communications via a network. Additionally, or alternatively, the network interface 306 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

An example embodiment described herein provides a consistent, fault tolerant timing degradation mitigation framework to enable a network, such as 5GS networks, to maintain timing through time source failures. Certain embodiments determine when a time source has been compromised and has failed or otherwise degraded such that mitigation strategies are employed to ensure that network elements maintain timing to properly synchronize with other network elements and to communicate with UEs.

FIG. 3 illustrates an example embodiment of GNSS integration at gNB. As shown, the GPS time sync chain 402 portion of the system includes the UTC (Coordinated Universal Time) at BIPM (International Bureau of Weights and Measures) at 404, the UTC of the USNO (U.S. Naval Observatory) at 406 and GPS (Global Positioning System) signals at 408. These are received by the GPS receiver 410. The 5G time sync chain portion 412 includes a 5G GM (Global Master) clock at the gNB 414, and the PTP transport network signal 416. These are used at the 5G device 418 with the DS-TT (Device-Side TSN Translator) user equipment.

With 5GS, operators invest in gNBs that have capabilities related to timing resiliency capabilities (e.g., high frequency stability, hold over capabilities) that are part of the overall resiliency response system. The status of the GNSS signal is important not only for the critical end user services served by 5G, but also to 5G itself in terms of its own reliability. Hold over capabilities are the ability of a network element to be self sufficient with respect to maintaining a time, such that a network element optionally has hold over capabilities of a predetermined duration after a time source is lost or degraded. This hold over capability can be leveraged in the event of a loss/failure/degradation of a time source to maintain a synchronous time for at least a minimum duration, beyond which the hold over capabilities are diminished and another time source is needed to maintain synchronous time.

Using GNSS as an example of time source, there are proprietary external systems available to determine the status of the GNSS signal. For example, with GNSS probes deployed in a network, an operator can check the status of the GNSS signal. However, the probes cannot provide information about how the health of the GNSS signal may impact the 5G signal or the timing synchronization services provided by the 5GS. For example, it is unknown if the system can maintain the time if the GNSS signal experiences an issue. Ensuring continuity of time services in 5G relies upon individual equipment/devices hold over capability or how long the entity can remain accurate when its synchronization source fails. Further, the knowledge of what 5GS time sources are available is another dimension to consider in 5G timing resiliency. Thus, the 5GS has unique capabilities in monitoring the health of a GNSS signal and understanding the impact of degradation of the GNSS signal to deliver 5G services. In order to exploit such capabilities to improve the timing resilience of the 5GS, it is beneficial to employ a general 5G timing resiliency assessment framework that can be built on top of existing vendor/implementation/proprietary specific timing solutions that can work in parallel with IEEE (Institute of Electrical and Electronics Engineers), IEC (International Electrotechnical Commission), and ITU-T based frameworks.

Provided herein is a method, apparatus, and computer program product for a network system, e.g., 5GS, to have consistent fault-tolerant time source (e.g., GNSS, PTP, etc.) degradation mitigation framework. Although described hereinafter in conjunction with 5GS utilizing GNSS and/or PTP as a time source, this embodiment is provided by way of an example and not of limitation as other embodiment may be employed with other network systems and other time sources. According to an example embodiment, a 5GS configures a time source (e.g., GNSS) status reporting from NG-RAN (Next Generation-Radio Access Network) nodes in a certain area. The Area of Interest (AoI) can be configured within the operations, administration, and management in the case of 5GS resiliency or it can be provided by the Application Function (AF) in a case where 5G timing is offered as a service. The area of interest can be mapped to a tracking area.

As described herein, the 5GS keeps track of the time source status for various NG-RAN nodes. When one or more NG-RAN nodes report a failure or degradation of the time source, such as due to interference (intentional/unintentional), spoofing, or natural causes, 5G core (5GC) can provide assistance regarding the action to be taken to ensure consistency across NG-RAN nodes and to ensure that the user equipment (mobile devices) in a given area are being synchronized to the same time domain.

Certain example embodiments provided herein employ three enablers to achieve the fault-tolerant GNSS degradation mitigation framework. A first enabler includes the collection of data at the 5GC to construct a time source database to manage timing resiliency (e.g., the time sources available in the deployment). Time Sensitive Communication and Time Synchronization Function (TSCTSF) in 5GC subscribes with NG-RAN and other entities with access to the time source and collects information to construct the database. An example of such a database with the minimum needed information is provided in the table of FIG. 4. FIG. 4 illustrates an example of a time source database at the TSCTSF with the minimum set of information. As shown, "NG-RAN node 1" has a location identified by a Tracking Area Identity (TAI) or a defined geographic area. The time source for NG-RAN node 1 is PTP GM clock and a GPS GNSS time with a hold over time interval of "Z" and time error function "Y". "NG-RAN node 2" has a location identified by one or more TAIs or a defined geographic area. The time source identifier includes GNSS Galileo with "YY" PPM frequency stability as the hold over. "User Plane Function (UPF) #1" has a location of a service area, with a time source of a PTP GM clock. The hold over of UPF #1 is a time interval and a time error function "Y".

The time source database is expected to be static in a deployment such that the TSCTSF can be pre-configured with this information during network deployment/planning. In the case of NG-RAN, it is also possible for the NG-RAN node to provide information related to the time source as part of NG setup information facilitating easy construction of the database. In case of other 5GS network elements, NF (Network Function) profile can be extended to include information related to the time source and register this with the Network Repository Function (NRF).

The second enabler of certain example embodiments includes monitoring health of the time source(s) within the 5GS. Conventional GNSS integration in 5G can be used to check the health of GNSS. The GNSS probes or GNSS reports that are already generated at the 5GS network elements can be fed into the 5GC described herein. When processing the time source reports, different alternatives can be considered. NG-RAN nodes and other 5GS network elements process the time source health reports locally and provide the TSCTSF with an alarm if an issue with the primary time source is detected (e.g., degradation, failure, etc.). NG-RAN nodes and other 5GS network elements provide the time source health reports to the TSCTSF and the TSCTSF processes the reports to identify issues. Alternatively, the Network Data Analytics Function (NWDAF) is responsible for the time source health reports processing and any related health analytics for the network. NWDAF provides the time source health results to TSCTSF.

The third enabler of certain example embodiments includes the 5GS influencing timing-resiliency operation. For timing-resiliency operation, two primary approaches can be used. The reactive approach includes where the TSCTSF is responsible for coordinating the solution/mitigation policies within the 5G network elements (e.g., NG-RAN or any 5GS Network Function) when an issue is detected with the primary time source. To do so, TSCTSF determines the area of impact for the detected issue (e.g., time source failure or degradation) and the network elements affected. TSCTSF can provide assessment/commands to enable a consistent fault-tolerant response to the detected time source issue. The proactive approach includes where the TSCTSF has configured policies within the 5G network elements ahead of time such that these network elements can take consistent action immediately after detection of potential time source issues.

Some embodiments described herein focus on NG-RAN nodes; however, other embodiments extend to any network element, such as any 5G network element, that needs time information to operate or is involved in time synchronization services as the enablers defined above focus on the network system, e.g., 5GS, being self-resilient to time source failures. Any time source can be used provided the same time reference signal (or time domain) is being used in the Area of Interest.

Referring again to the enablers of certain example embodiments provided herein, the time source database is constructed through collection of data at the 5GC to manage timing resiliency. Different sets of information can be considered. The minimum amount of information (e.g., as shown in FIG. 4), is the minimum set of information to determine "time independency" that the different network elements have within the 5GS deployment. The 5GS network elements include NG-RAN nodes or any 5GS Network Function, such as the User Plane Function (UPF), etc. The time source identifier is a unique ID to identify the clock source in the network. For a PTP network, the time source ID can be the clock ID to which the PTP node is synchronized. For GNSS, the time source ID can be the GNSS system (e.g., GPS, Galileo, etc.). The 5GS network element hold over capabilities can include frequency stability, time error, and the observation interval, for example.

Additional information considered for collection at the 5GC to manage timing resiliency includes additional sets of information for clock source and uncertainty of time source per network element based on its possible inputs/outputs, and what are the needs of the 5GS timing resiliency services where applicable. Information can include inherent diversity order, such as the number of independent time sources to which the network element has access. The information can further include a clock classification of a source that can establish quality (e.g., type of time source such as the Atomic Clock) and an indication of which nodes are impacted by this clock classification. An uncertainty of time source at a respective node can inform the reliability of the time source. A node can provide an output of time information, such as PPS (pulse per second) delivery to another node. When timing resiliency is provided as a service to end users, the UE (user equipment) hold over capabilities can inform a 5GS as to the vulnerability of degraded time at a node servicing the UE. The knowledge of the hold over capabilities of a UE can influence timing resiliency operation within the network system, e.g., 5GS. The node hold over capability information can be complemented with environment information that can impact the stability of the clock, such as a node deployed in a public or private area, climate-controlled environment, an area free of object interference, etc.

The health of a time source within the 5GS can be monitored using the TSCTSF. The TSCTSF can provide interaction with Access Management Function (AMF) to map from the AoI to a list of Tracking Area Identifiers (TAIs) and/or NG-RAN node identifiers based on local configuration or obtained from the NWDAF or O&AM. If the time source monitoring is configured as a service to end users, the Application Function can provide the AoI or the targeted UE identifiers. The TSCTSF can interact with the AMF to forward a time source monitoring request to the NG-RAN nodes. The time source health status updates can be configured as periodic, on-demand, or event-based reporting from the NG-RAN nodes. The TSCTSF can further obtain time source health status from the 5GC NF such as UPF via the SMF (Session Management Function). The TSCTSF of an example embodiment performs initial processing of time source reports from NG-RAN nodes and other 5GS network elements with access to the time source in order to check for failures/issues in a time source signal and influencing timing-resiliency operation. Interaction with the NWDAF can be performed to enable further time source health data analytics, if needed. The TSCTSF of an example embodiment subscribes to a new event "abnormal behavior/anomaly detection for time source" at the NWDAF.

The network system, e.g., 5GS, operation to influence timing resiliency of an example embodiment includes the proactive/reactive approaches described above. The TSCTSF can configure the NG-RAN nodes to adopt policies and actions depending on the affected area, time source, and capabilities for the node. If timing resiliency is configured as a service to end users (e.g., through UEs), the TSCTSF commands NG-RAN nodes to update a reference time information (RTI) uncertainty field provided via SIB9/RRC (System Information Block 9/Radio Resource Control) signaling. The TSCTSF can command the NG-RAN nodes to switch to hold over mode, such as to avoid the use of a secondary time source which may be beneficial if the secondary time source is available in a few, but not all nodes. The TSCTSF can command NG-RAN nodes to switch to a next time source available, such as PTP input. The TSCTSF notifies OA&M to enable the operator to take the proper action. The TSCTSF in 5G Release-17 is the NF that can know the time synchronization service logic (e.g., it is subscribed to BMCA resulting from NW-TT if (g)PTP is configured for the end users), so the benefit of letting the TSCTSF notify OA&M is that two dimensions of time synchronization requirements (e.g., 5GS self-resilience timing operation and, the time synchronization resiliency as a service to end users) can be understood with this NF. Therefore, the TSCTSF can be a first filter collecting health reports, processing them, and detecting issues before OA&M needs to be notified. Optionally, the NG-RAN nodes can notify the OA&M directly to take the appropriate action.

The TSCTSF of an example embodiment is configured to notify the affected NG-RAN nodes to handover served UEs to non-affected NG_RAN nodes if available, or the TSCTSF can provide a list of non-affected NG-RAN nodes such that affected NG-RAN nodes can make a handover decision. Such an embodiment enables the 5GS to have a coherent solution for a group of NG-RAN nodes that may have different implementation configurations. If the time source monitoring service is a service requested by the AF or UE, the TSCTSF triggers notification towards the AF/UEs. For an AF case, exposure to the AF that has subscribed for the event is performed. For the UE case, dedicated RRC (Radio Resource Control) signaling complements RTI (Reference Time Indication). The UE can request this information using UE Assistance Information with a request akin to a "GNSS health preference". With this request, the UE with a GNSS receiver that relies on GNSS time can leverage spoofing detection to the 5GS or can complement its own spoofing detection capabilities with the supplement flag alarm received from the 5GS.

According to an example embodiment described herein, a 5G core TSCTSF subscribes, for each 5GS network element time source information or obtains it as part of network setup to collect data to manage the time source database. The 5G core configures time sources (e.g., GNSS) reporting from NG-RAN nodes. The 5G core influences the timing resiliency operation.

FIGS. 5 and 6 illustrate an example implementation of the method described herein for message flow for a GNSS monitoring configuration for NG-RAN nodes. According to the illustrated embodiment, the TSCTSF does not have any prior information to construct the time source database, such that the TSCTSF needs to collect the information from the NG-RAN or UPF nodes. The TSCTSF is responsible for time source health report processing and commands the policies/actions to be performed at the NG-RAN or UPF nodes in the reactive timing resiliency approach. The requests provided in the message flow diagrams optionally include a configuration for a response to the request, such that a response is received according to the requested configuration of a response.

As shown in the message flow of FIG. 5, GNSS monitoring service request is optionally provided from the AF including the AoI and UE identifier(s) along with a subscription to GNSS events. The TSCTSF authorizes this request and determines the service's logic. The process of establishing timing resiliency begins with the 5GC collecting data to manage the services available with the AoI determination by the TSCTSF at (1) (with assistance from the AMF if needed) in FIG. 5. This identifies the region in which the service is concerned. Collection of the NG-RAN node identifiers within the AoI is performed at (2) across the AMF, TSCTSF, NWDAF, and OA&M. A Network Access and Mobility Function (Namf) communication request is sent to the AMF with a request for timing resiliency capabilities at (3). A downlink radio access network (DL RAN) configuration transfer is sent from the AMF to the NG-RAN node with a request for timing resiliency capabilities at (4). An uplink radio access network (UL RAN) configuration transfer is provided to the AMF together with a response regarding the timing resiliency capabilities at (5). A Namf_Communication response is then sent back to the TSCTSF at (6) and the TSCTSF creates a time source database at (7) with a determination of GNSS monitoring reporting.

The 5GC configures the GNSS reporting from the NG-RAN nodes after the configuration has occurred. The TSCTSF provides at (8) a Namf_Communication request including the GNSS monitoring request and GNS monitoring subscription to the AMF, while the AMF sends a DL RAN configuration transfer with the GNSS monitoring request to the NG-RAN nodes. The NG-RAN nodes return the UL RAN configuration transfer with the GNSS monitoring response at (10). The AMF provides the Namf_Communication response with the GNSS monitoring response to the TSCTSF, and the TSCTSF optionally provides the GNS monitoring service response to the AF. The process continues in FIG. 6, where a GNSS monitoring report is provided from one or more NG-RAN nodes to the AMF at (12), and the AMF provides the Namf Communication to notify the TSCTSF with the GNSS monitoring report at (13). The TSCTSF processes the GNSS reports at (14) and optionally forwards GNSS reports or a post processing result to NWDAF for further GNSS health analytics at (15).

The system of example embodiments enables the 5GC to influence the timing resiliency operation. If a timing issue is detected, or a GNSS issue is detected as in the illustrated embodiment at (16), a determination is made by the TSCTSF of the area impacted and the network elements impacted by the issue. This timing issue event can be provided to the AF as a notification. The TSCTSF influences time synchronization operation at NG-RAN nodes at (17) with a Namf_Communication request including a timing resiliency command at (18). A DL RAN configuration transfer is provided to the NG-RAN node(s) affected including the timing resiliency command at (19). A UL RAN configuration transfer is provided from the affected NG-RAN node including acknowledgement of the timing resiliency command at (20). A Namf_Communication response is provided at (21) to the TSCTSF including the acknowledgement of the timing resiliency command. The TSCTSF optionally notifies the operator of the detected GNSS issue at (22).

FIGS. 7 and 8 illustrate a similar example as FIGS. 5 and 6, with a UPF node and monitoring of a PTP clock input. According to the embodiment of FIGS. 7 and 8, the TSCTSF again does not have prior information to construct the time source database, such that it needs to collect the information from the NG-RAN or UPF nodes. The TSCTSF is responsible for the time source health report processing and commands the policies and actions to perform at the NG-RAN and/or UPF nodes. There are two primary impacts of the embodiment of FIGS. 7 and 8. The TSCTSF and SMF need a new service operation to have a node level communication between these entities. The TSCTSF is not requesting a service for a specific PDU session, the TSCTSF needs to subscribe/command a set of UPF(s) that may operate the service area of interest of the TSCTSF. In this signaling flow, the service operation is referred to as "Nsmf_Communication". SMF and UPF also require node level signaling, and in the example embodiment, Packet Forwarding Control Protocol (PFCP) messages are reused adding a new case for time source monitoring configuration. The PFCP Association Update procedure is used to retrieve UPF timing resiliency capabilities and forward timing resiliency commands. The PFCP node report procedure is used to configure UPF time source monitoring and reporting towards the SMF.

As shown in FIG. 7, the 5GC collects data to manage the sources available with the AoI determination made at (1) by the TSCTSF, and the UPF node identifiers within the AoI are collected at (2), with the SFM mapping of the AoI to a service area. The Nsmf_Communication request is sent to the SMF at (3) with a request for timing resiliency capabilities, where the communication provides a configuration for the anticipated response. The SMF provides a request for a PFCP node report at (4) with a request for timing resiliency capabilities, where the communication provides a configuration for the anticipated response. The UPF responds with the PFCP node report response at (5) with a response as to the timing resiliency capabilities in the requested configuration. A Nsmf_Communication response is provided to the TSCTSF at (6) with the timing resiliency capabilities according to the requested configuration. The TSCTSF creates the time source database and determines the monitoring reporting for the timing of "Clock X".

The 5GC configures the GNSS reporting from the UPF beginning with a Nsmf_Communication request at (8) including Clock X monitoring request and Clock X monitoring subscription. The SMF provides a PFCP node report request at (9) with the Clock X monitoring request. The UPF responds with the PFCP node report response at (10) with the Clock X monitoring response. The Nsmf_Communication response with the Clock X monitoring response is provided to the TSCTSF at (11). The UPF sends a PFCP node report with a Clock X monitoring report at (12) to the SMF, while the SMF provides the Nsmf_Communication notification at (13) including the Clock X monitoring report to the TSCTSF. The TSCTSF then processes the Clock X reports at (14) and optionally forwards the reports or post-processing result to NWDAF for further Clock X health analytics (15).

The 5GC influences the timing resiliency operation when a Clock X issue is detected at (16) and a determination of the impacted area and network elements affected are made. The TSCTSF influences the time synchronization operation at the UPF in (17) with a Nsmf_Communication request sent to the SMF at (18) including the timing resiliency command to influence the operation. A PFCP Association Update request is made to the UPF at (19) with the timing resiliency command. The UPF responds with the PFCP Association Update response at (20) together with acknowledgement of the timing resiliency command. The Nsmf_Communication response is provided to the TSCTSF at (21) with the acknowledgement of the timing resiliency command. Optionally, the TSCTSF notifies the operator of detection of a Clock X timing issue at (22)

FIG. 9 illustrates a flowchart of an example embodiment of a technique for monitoring time sources for nodes of a network and providing timing resiliency solutions in the event of time source degradation or failure or recovery. Time synchronization is established at 510 within a network including a plurality of nodes using a time source. The time synchronization may be established, for example, using TSCTSF with a time source that optionally includes a GNSS signal or PTP. The TSCTSF can be embodied, for example, by the apparatus 300 which includes means, such as the processor 302, the memory 304, or the like for establishing the time synchronization with the network including the network elements, such as the NG-RAN nodes. At operation 520, an indication is configured and received regarding at least one of a degradation or a failure of the time source for at least one node. The indication may be received, for example, by means including the processor 302, the network interface 306 or the like of the apparatus 300, and processed, for example, by processor 302 of the apparatus. At operation 530, an indication is configured and received regarding at least recovery of the time source for the at least one node. This indication may also be received, for example, by means including the processor 302, the network interface 306 or the like of the apparatus 300, and processed, for example, by processor 302 of the apparatus. At operation 540, an action to be taken is determined within the network upon failure at the at least one node in response to the at least one of the degradation or failure of the time source for the at least one node. This determination may be performed, for example, by apparatus 300, embodied as the TSCTSF, the NG-RAN node, the UPF, or other elements described above to determine the appropriate action for responding to the loss of time signal. The component, when embodied by the apparatus 300, can make the determination through means, such as the processor 302. This determination enables corrective action to be taken to restore a valid time signal to affected components of the network.

FIG. 10 illustrates another example embodiment of a flowchart of a technique for monitoring time sources for nodes of a network and providing timing resiliency solutions in the event of time source degradation or failure. A time-synchronization dependent service request is received from a UE operating on a network at 610. The UE may be embodied, for example, by apparatus 300 including means, such as the processor 302, the network interface 306 or the like, to provide the request to a service provider. The service provider, which may be TSCTSF and may be embodied by apparatus 300, includes means for receiving the request, such as through the processor 302, the network interface 306 or the like, and means for processing the request (processor 302) and means for storing the request even if temporarily (processor 302, memory 304 or the like). An area of interest is determined for the service request and a plurality of nodes supporting the network in the area of interest are determined at 620. The nodes may be embodied by NG-RAN nodes, for example, and the apparatus may include means, such as processor 302, for determining the area of interest as depicted at operation 620. A time-synchronization issue including a time source of at least one node of the plurality of nodes is detected at 630. This detection may be in the form of a received event, report, or other indication at apparatus 300 that includes means for receiving such an indication, such as network interface 306 and/or processor 302. A time-synchronization issue response is determined at 640. This may be determined at the TCSTSF, the node, or other network component, where such a network component, embodied by apparatus 300, includes means, such as processor 302, to determine the response. At operation 650, operation is caused of at least one of user equipment and the at least one node according to the time-synchronization issue response. This may be caused by a network component embodied by apparatus 300, with means, such as processor 302 and network interface 306, for example.

FIG. 11 illustrates still another example embodiment of a flowchart of a technique for monitoring time sources for nodes of a network and providing timing resiliency solutions in the event of time source degradation or failure. As shown at operation 710, transmission of a request for a time-synchronization dependent service to a network supported by a plurality of nodes is caused. This may be performed, for example, by a network component embodied by apparatus 300 including means, such as processor 302, network interface 306 or the like, for causing transmission of the request. At operation 720, a node of the plurality of nodes is engaged for operation of the time-synchronization dependent service. An indication of a time-synchronization issue is received at 730, where the issue is received by a network component embodied by apparatus 300 using means such as processor 302, network interface 306 or the like for receiving the issue. An indication of a handover from the node of the plurality of nodes to a different node of the plurality of nodes is received at 740. This indication is optionally received at a network component embodied by apparatus 300 through means such as processor 302, network interface 306 or the like. Operation of the time-synchronization dependent service is continued with the different node as shown at operation 750. This may be performed by one or more network components, each of which may be embodied by apparatus 300, for example.

FIGS. 9, 10, and 11 illustrate flowcharts depicting operations according to an example embodiment of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures or operations described above may be embodied by computer program instructions. In this regard, the computer program instructions which embody the procedures or operations described above may be stored by a memory 304 of an apparatus (e.g., apparatus 300, UE 110, PCF 260) employing an embodiment of the present invention and executed by a processor 302. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus for a core network, the apparatus comprising:
    at least one processor; and
    at least one memory including computer program code configured to, when executed by the at least one processor, cause the apparatus at least to perform:
        establishing time synchronization within a network, the network comprising at least one node using a time source, and the network comprising the core network;
        obtaining an indication regarding a health of the time source, wherein the indication of the health of the time source indicates at least one of a degradation or a failure of the time source monitored by the at least one node, wherein the indication is based on at least one of GNSS (Global Navigation Satellite System) reports or PTP (Packet Transfer Protocol) reports received by the core network of the network from the at least one node;
        and
        determining, based on the indication, an action to be taken in response to the at least one of the degradation or the failure of the time source for the at least one node, wherein the action to be taken comprises instructing the at least one node to leverage either hold over functionality or a backup time source.

2. The apparatus of claim 1, wherein the indication of the health of the time source that indicates the at least one of the degradation or the failure of the time source comprises at least one of:
    an indication of use of hold over capability, or
    an indication of use of backup time source when the time source fails.

3. The apparatus of claim 1, wherein the obtaining the indication comprises receiving the indication of the at least one of the degradation or the failure of the time source for the at least one node from a Network Data Analytics Function of the core network.

4. The apparatus of claim 1, wherein the action to be taken is determined based, at least in part, on an area impacted by the at least one of the degradation or the failure of the time source for the at least one node.

5. The apparatus of claim 1, wherein the action to be taken further comprises causing the apparatus to provide instruction to the at least one node to handover any user equipment served by the at least one node to another node of the at least one node having a reliable time source.

6. The apparatus of claim 1, wherein the action to be taken further comprises causing the apparatus to provide a list of nodes of the at least one node having a reliable time source.

7. The apparatus of claim 1, wherein the computer program code, when executed by the at least one processor, further causes the apparatus to perform:
    collecting data from the network to determine capabilities for timing resilience, hold over functionality, or access to backup time source, wherein the action to be taken is determined based on the data collected from the network.

8. The apparatus of claim 7, wherein the collecting the data from the network comprises causing the apparatus to collect the data from the network to build a time source database.

9. The apparatus of claim 1, wherein the computer program code, when executed by the at least one processor, further causes the apparatus at least to perform:
    receiving a time-synchronization dependent service request from a user equipment (UE) operating on the network; and
    determining an area-of-interest for the time-synchronization dependent service request and determining a first plurality of nodes comprised in the network and that support the network in the area-of-interest;
    detecting a time-synchronization issue associated with the time source;
    determining a time-synchronization issue response for the time-synchronization issue; and
    causing, according to the time-synchronization issue response, operation of at least one of the following: the user equipment or the at least one node of the first plurality of nodes.

10. The apparatus of claim 9, wherein the causing the operation according to the time-synchronization issue response comprises:
    causing respective nodes of the at least one node of the first plurality of nodes to implement the time-synchronization response based on a response plan stored locally at the respective nodes of the at least one node of the first plurality of nodes.

11. The apparatus of claim 9, wherein the causing the operation according to the time-synchronization issue response comprises:
    providing a command to the at least one node of the first plurality of nodes to update reference time information uncertainty.

12. The apparatus of claim 9, wherein the causing the operation according to the time-synchronization issue response comprises:
    providing a command to the at least one node of the first plurality of nodes to switch to a new available time source.

13. The apparatus of claim 9, wherein the causing the operation according to the time-synchronization issue response comprises:
    providing an instruction to the at least one node of the first plurality of nodes to handover user equipment served by the at least one node of the first plurality of nodes to other nodes of the first plurality of nodes, wherein the other nodes of the first plurality of nodes are identified as having correct time-synchronization.

14. The apparatus of claim 1, wherein the obtaining the indication comprises processing the at least one of the GNSS reports or the PTP reports to determine the indication.

15. An apparatus for a core network, the apparatus comprising:

at least one processor; and at least one memory including computer program code configured to, when executed by the at least one processor, cause the apparatus at least to perform:

establishing time synchronization within a network comprising a plurality of nodes using a time source, the network comprising the core network;

obtaining, from a Network Data Analytics Function, an indication regarding at least one of a degradation or a failure of the time source for at least one node; and determining, based on the indication, an action to be taken in response to the at least one of the degradation or the failure of the time source for the at least one node, wherein the action to be taken comprises instructing the at least one node to leverage either hold over functionality or a backup time source, wherein the action to be taken is determined based, at least in part, on an area impacted by the at least one of the degradation or the failure of the time source for the at least one node.

16. The apparatus of claim 15, wherein the indication is based on at least one of GNSS (Global Navigation Satellite System) reports or PTP (Packet Transfer Protocol) reports fed into the core network.

17. The apparatus of claim 15, wherein the action to be taken further comprises providing instruction to the at least one node to handover any user equipment served by the at least one node to another node of the plurality of nodes having a reliable time source.

18. An apparatus for a core network, the apparatus comprising:

at least one processor; and at least one memory including computer program code configured to, when executed by the at least one processor, cause the apparatus at least to perform:

establishing time synchronization within a network comprising a plurality of nodes using a time source, the network comprising the core network;

obtaining an indication regarding at least one of a degradation or a failure of the time source for at least one node of the plurality of nodes; and determining, based on the indication, an action to be taken in response to the at least one of the degradation or the failure of the time source for the at least one node, wherein the action to be taken comprises instructing the at least one node to leverage either hold over functionality or a backup time source and to handover any user equipment served by the at least one node to another of the plurality of nodes having a time source that is reliable.

19. The apparatus of claim 18, wherein the action to be taken is determined based, at least in part, on an area impacted by the at least one of the degradation or the failure of the time source for the at least one node.

20. The apparatus of claim 18, wherein the computer program code, when executed by the at least one processor, further causes the apparatus to perform:

collecting data from the network to determine capabilities for timing resilience, hold over functionality, or access to backup time source, wherein the action to be taken is further based on the data collected from the network.

* * * * *